United States Patent [19]

Mohler

[11] 4,439,862
[45] Mar. 27, 1984

[54] RIGID LASER MIRROR MOUNT AND PROTECTION ASSEMBLY

[75] Inventor: Galen E. Mohler, Los Altos, Calif.

[73] Assignee: Cooper LaserSonics, Santa Clara, Calif.

[21] Appl. No.: 237,928

[22] Filed: Feb. 25, 1981

[51] Int. Cl.³ ............................................... H01S 3/08
[52] U.S. Cl. ................................... 372/107; 372/108; 372/98; 350/288
[58] Field of Search ................. 372/107, 99, 108, 98; 350/288, 287, 310, 299

[56] References Cited

U.S. PATENT DOCUMENTS

| | | |
|---|---|---|
| 3,814,507 | 6/1974 | Osborn et al. |
| 3,864,029 | 2/1975 | Mohler ............................... 372/107 |
| 3,936,768 | 2/1976 | Lchinose et al. |
| 3,953,113 | 4/1976 | Shull . |
| 3,966,309 | 6/1976 | Mohler . |
| 3,987,373 | 10/1976 | Mohler ............................... 372/107 |
| 4,229,709 | 10/1980 | McMahan . |
| 4,278,324 | 7/1981 | Zipfel . |

Primary Examiner—William L. Sikes
Assistant Examiner—Léon Scott, Jr.
Attorney, Agent, or Firm—C. Michael Zimmerman

[57] ABSTRACT

A mounting assembly for supporting a Brewster window and mirror to intercept a laser beam at the end of a gas laser envelope includes an elongated tubular member having one end opening into the gas laser envelope and an opposite end closed by the Brewster window. A rigid housing supporting the mirror is joined to the tubular member close to the end having the Brewster window by a flexible sealed joint that permits limited movement of the housing relative to the tubular member generally along the length of the tubular member while inhibiting flow of contaminants from the exterior into the passage formed by the rigid housing between the Brewster window and mirror. A seal is placed between the rigid housing and mirror to inhibit flow of such contaminants into the passage from the mirror location. A mounting structure joins the rigid housing to the gas laser envelope to secure them together and includes an adjustment mechanism that permits the housing to be moved relative to the envelope for adjusting the angular orientation of the supported mirror relative to the intercepted laser beam.

16 Claims, 2 Drawing Figures

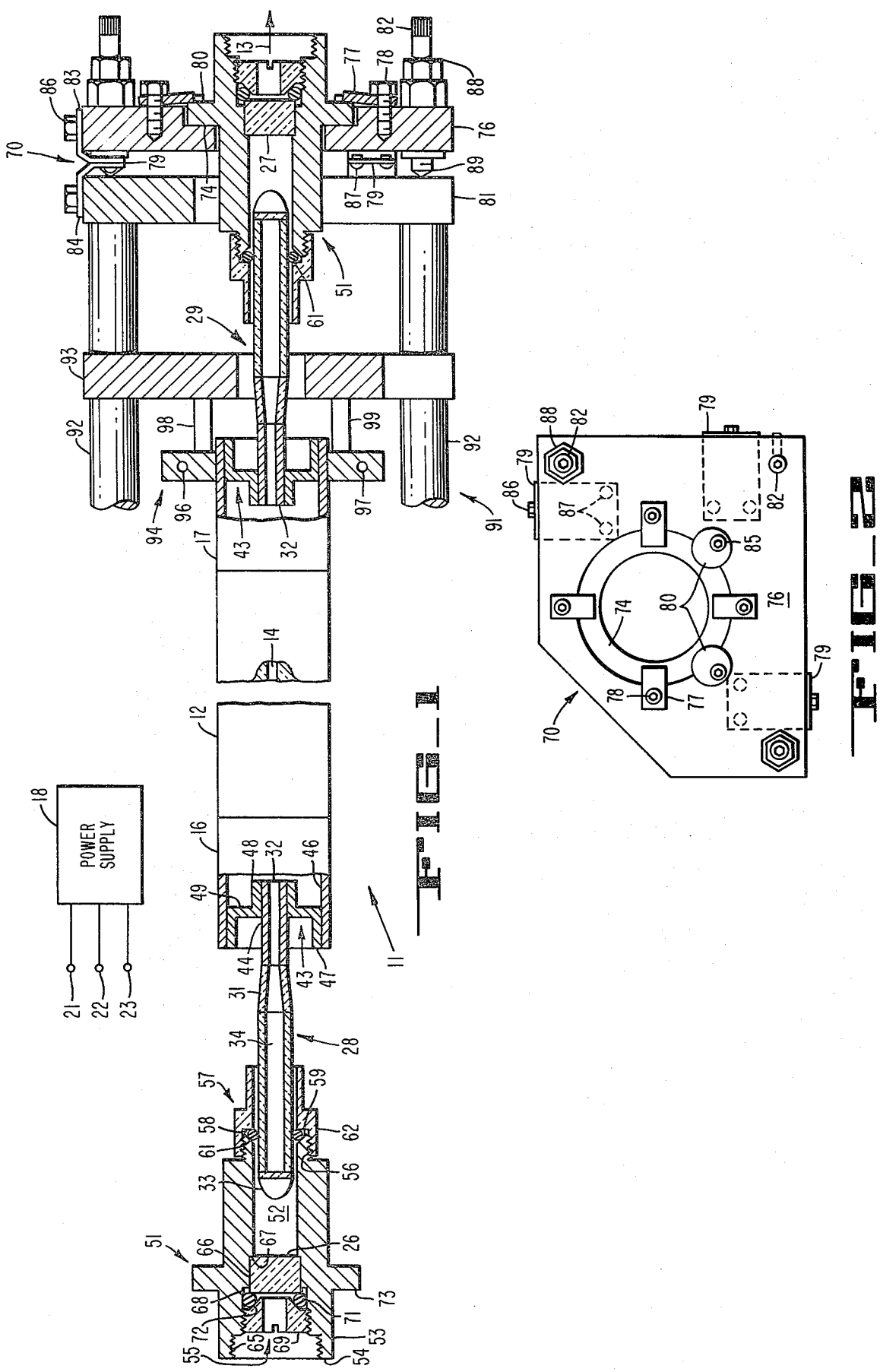

RIGID LASER MIRROR MOUNT AND PROTECTION ASSEMBLY

DESCRIPTION

The present invention relates generally to mounting assemblies for optical elements of gas lasers and, more particularly, to an improved mounting assembly for gas laser optical elements providing sound, firm support for the optical elements while maintaining them free of contamination.

Gas lasers include an elongated envelope containing a lasable gas medium, which is supported between opposing mirrors to define therewith a laser resonator. Ordinarily, the mirrors are located exteriorly of the envelope and the coherent radiation generated by the lasing action within the envelope is allowed to pass to and from the mirrors through Brewster windows closing opposite ends of the envelope. A sealed enclosure surrounds the Brewster window and mirror at each end of the envelope to maintain the window, mirror and the region between them free of contaminants from the exterior. Precise and stable angular alignment of the mirrors is required to assure that the generated laser radiation is reflected by the mirrors to make the necessary passes through the lasing medium for laser oscillation. This is achieved by mounting mechanisms that permit precise adjustment of the angular orientation of the mirrors while providing stable positioning.

In my U.S. Pat. No. 3,864,029, I describe a compact and simple assembly for adjustably supporting laser mirrors while shielding the mirrors and associated Brewster windows from contaminants in the surrounding environment. In that assembly, a tubular cover is supported at one of its ends by the Brewster window assembly and extends to be supported at its other end by a mirror mounting structure. The mirror mounting structure includes a mirror support means that permits precise adjustment of the angular orientation of the mirrors to the laser beam path. To facilitate the adjustment of the angular orientation and avoid undue strain on the associated fragile Brewster window assembly, the tubular cover includes a tubular ball joint along its length that permits the mirror end of the tubular cover to be moved transverse to the laser beam axis without unduly disturbing the Brewster window end of the tubular cover. This tubular cover construction minimizes the strain placed on the fragile Brewster window assembly when adjustments are made in the angular orientation of the associated mirror. However, for lasers that are to be used in applications where shock, vibrations and other substantial disturbances are likely to be encountered, it is desirable to have a more substantial assembly for adjustably supporting the mirrors while shielding them and their associated Brewster windows from contamination. Such disturbances will produce corresponding disturbances in the positions of weakly or less than rigidly held laser optical elements. Disturbing the positions of the laser optical elements usually produces one or more of the following deleterious effects: detuning of the laser, misalignment of the laser beam and generation of noise in the laser beam. Of course, such effects are undesirable and great effort is taken in the construction of precision lasers to avoid them.

The present invention is a compact, simple rigid laser mirror mount and protection assembly providing the desired substantial construction that renders the laser's optical elements less sensitive to potentially harmful disturbances. Furthermore, the construction permits the angular orientation of the laser mirrors to be adjusted relative to associated Brewster windows without producing damaging or destructive strain in the fragile Brewster window assemblies and provides an effective shield for the mirrors, windows and regions therebetween against contamination from the surrounding environment. More specifically, the laser mirror mount and protection assembly of the present invention is for use in gas laser apparatus, which typically includes an elongated envelope containing a lasable gas medium located between laser radiation transmission windows and mirrors to define a laser beam path. The assembly of the present invention includes an enclosure adapted to be joined to the laser envelope by a hermetically sealed joint so that the enclosure opens into and extends from the envelope to encircle the laser beam path with the interiors defined by the enclosure and envelope isolated hermetically from the surrounding environment. The enclosure includes a laser radiation transmissive window positioned to intercept the laser beam path whereby the laser radiation is permitted to pass from the interior to the exterior of the enclosure along the laser beam path. A rigid housing defining a passage is coupled by a flexible sealed joint to the enclosure, with the window of the enclosure in the passage and the passage extending along the laser beam path. The flexible sealed joint permits limited relative movement between the rigid housing and the enclosure in the direction of the laser beam path while inhibiting flow into the passage of contaminants from the surroundings. A seat is defined by the rigid housing for supporting a mirror and a seal is positioned between the mirror and housing to inhibit the flow into the passage of contaminants from the surroundings. A mounting structure is adapted to secure the rigid housing to the envelope whereby substantially all of the support for the rigid housing is provided by the structure supporting the laser envelope. With the housing supported in this manner, it bears on the enclosure containing the radiation transmissive window with minimal force. This feature serves to protect fragile window assemblies from damage. In addition, the flexible sealed joint permits the rigid housing to be moved a limited amount transversely of the laser beam path for mirror alignment purposes without harmfully straining the enclosure. As the housing is so moved by a mechanism provided to adjust the angular orientation of the retained mirror relative to the laser beam path, the flexible sealed joint moves in a compensating fashion generally along the laser beam path so that no harmful force is transmitted to the enclosure. As long as movement of the rigid housing relative to the enclosure is limited to the small amounts typifying mirror alignments, the flexible sealed joint will protect the enclosure from damage. This is of particular advantage because enclosures provided with laser radiation transmissive windows are often quite expensive.

As can be appreciated from the foregoing description of the rigid laser mirror mount and protection assembly of the present invention, the assembly is characterized by a sturdy, compact construction that protects the fragile elements against harmful forces without sacrificing the contamination protection and mirror adjustment features characterizing prior art structures.

BRIEF DESCRIPTION OF THE DRAWINGS

The foregoing and other features and advantages of the mirror mount and protection assembly of the present invention will become more apparent upon consideration of the following detailed description of the preferred embodiments of the invention and appended claims taken together with the accompanying drawings in which:

FIG. 1 is a top, partially sectional view, broken in length, of a gas ion laser plasma tube and end mounting assemblies employed with a preferred embodiment of the present invention; and FIG. 2 is an elevation view showing only the end mounting assembly employed with the plasma tube illustrated in FIG. 1.

DETAILED DESCRIPTION OF THE PREFERRED EMBODIMENT

Briefly stated, the present invention is directed to a mirror mounting assembly for laser apparatus. While a preferred embodiment of the present invention is described as arranged for use with a particular gas ion laser, the present invention is adaptable for use with other gas laser media devices. FIG. 1 illustrates the principal elements of a gas ion laser apparatus 11 in which the preferred embodiment of the present invention is employed. The principal elements are found in all lasers, although they usually differ in specific construction in different types of lasers. Every laser 11 includes a structure 12 for confining a lasable medium along a laser beam path, indicated by arrow 13. The lasable medium includes quantum resonant particles that, upon excitation, produce coherent radiation at one or more selected frequencies in the infrared, visible and ultraviolet range of the frequency spectrum. In gas ion laser apparatus, an ionizable gas, such as argon, is confined at a pressure of about 1 Torr within an enclosure, such as a gas discharge bore 14 defined by an elongated plasma tube structure 12 to extend along the laser beam path 13. Cathode and anode electrode structures 16 and 17, respectively, are provided at opposite ends of the plasma tube 11 for initiating and maintaining an electrical discharge in the lasable argon medium. The cathode electrode structure 16 typically includes a directly heated cathode that is heated by an AC current generated by a power supply 18 and coupled to the cathode by terminals 21 and 22. An electrical discharge is initiated in the lasable gas medium by a high voltage pulse generated by the power supply 18 and applied between the anode and cathode electrodes by terminal 23 coupled to the anode and by terminals 21 and 22 coupled to the cathode, terminals 21 and 22 being at a common DC potential. The electrical discharge is maintained between the cathode and anode electrodes by a DC voltage generated by the power supply 18 and applied between the anode and cathode electrodes by terminal 23 coupled to the anode and by terminals 21 and 22 coupled to the cathode.

Mirrors 26 and 27 are supported in opposition to each other at opposite ends of the plasma tube 12 along the laser beam path 13 to reflect the laser radiation back and forth through the gas discharge bore 14 to effect lasing action within the confined lasable gas medium. The mirrors and elongated plasma tube 12 form a resonator structure that produces a laser beam of coherent radiation propagated along the laser beam path 13. One or both of the mirrors 26 and 27 are made partially transparent to the generated coherent radiation so that the laser beam can be transmitted along path 13 to a utilization device. In gas laser apparatus embodiments having their mirrors 26 and 27 supported outside the plasma tube structure 12, Brewster window assemblies 28 and 29 are provided at opposite ends of the plasma tube structure to pass the coherent radiation generated within the gas discharge bore 14 to the mirrors. Each of the Brewster window assemblies includes a tubular enclosure 31 defining a channel 34 extending along the laser beam path 13 from an open end 32 supported at the plasma tube to a radiation transmissive window 33 supported at the opposite end of the enclosure. Coherent radiation generated by the lasing gas medium within the gas discharge bore 14 passes along the channel 34 to the windows 33. The windows are selected to pass coherent radiation polarized in a preferred direction and are oriented relative to the laser beam path so that preferentially polarize coherent radiation is transmitted to the associated mirrors. The laser apparatus 11 includes a support structure for supporting the laser elements so that the generated laser beam is maintained along a desired path 13 with a high degree of stability.

The present invention will now be described in detail as employed in a preferred embodiment of an air cooled gas ion laser apparatus 11. The elongated plasma tube 12 is a cylindrical body, preferably constructed of ceramic material, such as beryllium oxide (BeO), having high thermal conductivity and good vacuum properties. The cylindrical BeO body forming the plasma tube 12 defines a long, longitudinally extending cylindrical bore 14 at its center that forms the gas discharge path. Gas return paths (not shown) communicating with the bore 14 may be provided internally within the BeO body or by a separate structure externally thereof. During assembly of the laser apparatus 11, a lasable gas medium is admitted to the cylindrical bore 14 through a suitable inlet (not shown) at one end of the plasma tube 12.

Opposite ends of the BeO plasma tube 12 are brazed to coaxially extending metal cylinders forming the housings for the cathode and electrode structures 16 and 17. The metal cylinders are, preferably, of a material, such as the metal alloy sold under the trademark "Kovar," having a low coefficient of thermal expansion similar to the material used in constructing the plasma tube 12.

In a preferred form of the Brewster window assemblies 28 and 29, the tubular enclosure 31 is a unitary, hollow cylindrical body of a composite metal/glass construction, starting with a metal segment at the open end 32 of the enclosure 31, followed by a glass graded seal segment at the midsection of the enclosure and ending with a glass segment at the end of the enclosure terminating at the Brewster window 33. In FIG. 1 of the drawings, this composite construction is represented by using the metal cross section symbol along the metal segment of the cylindrical enclosure, the glass cross section symbol for the remainder of enclosure and junction lines between the three segments.

Such Brewster window assemblies are expensive and fragile. Therefore, care must be taken in mounting and supporting such assemblies to avoid damaging or destroying them. In this regard, each Brewster window assembly 28 and 29 is joined at its open end 32 to one of the metal cylinders 16 and 17 by a circular metal flange 43 radially extending between the outer surface 44 of the metal section of the cylindrical enclosure 31 and the inside surface 46 of the metal cylinder. The flange 43 defines a circular aperture at its center for receiving the open end 32 of the cylindrical enclosure 31 and has a pair of lips 47 and 48 oppositely extending perpendicularly from a radially extending interconnecting web 49 at the periphery and about the circular aperture, respectively, of the flange. The lip 47 nests with the inside surface 46 of the metal cylinder and the lip 48 encircles to nest with the outer surface 44 of the cylindrical enclosure 31 at its open end 32. Hermetic seals are formed between the flange 43 and the encircled enclosure 31 and encircling metal cylinder 16 by weld or braze joints at their mating surfaces. The hermetically sealed plasma tube 12 and Brewster window assemblies 28 and 29 confine the lasable gas medium to the space defined by the communicating plasma tube bore 14 and channel 34 and prevent escape of the lasable medium to the surroundings as well as entry into the space of contaminants from the surrounding environment.

The mirrors 26 and 27 are retained in mirror housing assemblies 51 that are supported to extend from Brewster window assemblies 28 and 29, respectively, without placing a substantial load on them. The housing assemblies 51 extend along the laser beam path to form contamination-free passageways 52 for the laser beam between Brewster window assemblies 28 and 29 and the mirrors 26 and 27, respectively. The presence of contaminants in the passageway 52 can cause radiation losses due to reflection and absorption of the generated radiation by the contaminants. The housing assembly 51 includes a rigid, elongated cylindrical tubular segment 53 defining a counter bore 55 at one end 54 for receiving and supporting a mirror and an externally threaded rigid neck segment 56 at the opposite end for surrounding the Brewster window end of the cylindrical enclosure 31 and joining the housing assembly 51 thereto. A flexible seal is employed to join the housing assembly 51 to the cylindrical enclosure 31 in a manner that permits the housing assembly to move relative to the cylindrical enclosure generally in the direction of the length of the cylindrical enclosure. The flexible seal includes a rigid collar member 57 encircling the cylindrical enclosure 31 with a shoulder 58 facing towards a tapered end surface 59 of the neck segment 56. The shoulder forms a seat for a resilient O-ring seal 61 and the end surface is tapered to form a seal face that faces toward the cylindrical enclosure and seat. A seal is formed between the housing assembly 51 and cylindrical enclosure 31 by threading an internally threaded extension 62 of the collar member 57 onto the neck segment 56, which is provided with external mating threads. This presses the O-ring seal 61 between the seal face 59 and seat 58 and forces it against the cylindrical enclosure 31 to form the seal. The housing assembly 51, collar member 57 and resilient O-ring seal are dimensioned and the collar member 57 is threaded onto the neck segment 56 with a force that permits limited movement between the housing assembly/collar member structure and the cylindrical enclosure 31 of the encircled Brewster window assembly without breaking the seal. For example, as will be explained in detail hereinbelow, the mirror housing assembly is mounted to permit it and the retained mirror to be tilted a limited amount relative to the laser beam path 13 for purposes of angularly aligning the retained mirror relative to the laser beam path. When the housing assembly is moved in this manner, the O-ring seal 61 moves along the outer surface of the cylindrical enclosure 31 a corresponding amount in the direction of the laser beam path 13.

The counter bore 55 defined at the end 54 of the housing assembly 51 has a first part 66 of a selected first diameter that extends for a selected length from its bottom end 67 towards the end 54 of the housing assembly 51. The bottom end 67 of the counter bore 55 forms a seat against which the mirror 26 rests and the first diameter of the counter bore is selected so that the mirror is snuggly received therein. The length of the first part 66 of the counterbore 55 is selected to be less than the corresponding dimension of the seated mirror 26 so that the seated mirror extends into a second part 68 of the counter bore towards the end 54 of the housing assembly 51. The second part 68 of the counter bore 55 has a second diameter larger than the diameter of the first part 66 of the counter bore. The second part 68 of the counter bore has a threaded length for receiving an externally threaded sealing ring 69 and a smooth surface length adjacent the first part 66 defining a seat for an O-ring seal 71. The sealing ring 69 has a tapered end surface 72 forming a seal face that faces towards the back side of the mirror 26 and the wall of the counter bore. The centrally located aperture formed by the sealing ring permits the laser beam to pass from a partially transparent mirror to an exteriorly located utilization device. A seal is formed between the housing assembly 51 and mirror 26 by threading the sealing ring 69 into the counter bore 55 to press the O-ring seal 71 between the seal face 72 and the facing mirror 26 and counter bore wall surfaces. This seal together with the flexible seal provided at the neck segment 56 of the housing assembly 51 prevent contaminants from the surrounding environment from reaching the Brewster window 33, the reflecting surface of the mirror 16 and the passageway 52 defined therebetween.

The housing assembly 51 in the illustrated embodiment of the present invention is a straight, cylindrical housing having no other optical elements located between the Brewster window 33 and mirror 26. In some laser application, however, it is desired to direct the laser beam along a path extending at an angle to the plasma tube 12. For such applications, the housing assembly 51 includes an extension that intersects the tubular segment 53 at the end 54 at the desired angle. A mirror, prism or other beam directing element is mounted at the intersection to redirect the laser beam along the angularly extending path. To protect those optical elements from the adverse effects of contaminants of the surrounding environment, the O-ring seal 68 and related sealing structure are relocated at the location of the other beam directing element to form a seal between it and the surrounding environment. Depending on the application, the O-ring seal 71 may be relocated with or without relocating the laser resonator mirror 26. A further internally threaded part 65 is provided at the end of the counter bore 55 for coupling the laser apparatus 11 to a utilization device.

Various kinds of resonator support assemblies can be utilized in the apparatus of the present invention to support the mirror housing assemblies 51 and other components forming the laser resonator structure without placing undue strain on the Brewster window assembly. Rod structures and L-shaped brace structures are the most common forms of resonator support assemblies utilized to support laser resonator structure. The present invention will be described in detail with reference to a preferred embodiment arranged to employ a rod-type resonator support assembly. Reference is now made to FIGS. 1 and 2, which together illustrate a preferred way of supporting the mirror housing assemblies 51 in a manner that minimizes the load placed on the associated Brewster window assemblies 28 and 29. Each mirror housing assembly includes a rigid, circular flange 73 encircling its cylindrical tubular segment 53 to extend outwardly therefrom at a location along its length proximate the mirror location. The circular flange 73 is seated within a recess 74 defined by a mirror housing assembly mounting plate 76 (FIG. 2) of a tuning assembly 70. The depth of the recess 74 is selected so that the flange 73 extends beyond the surface of the plate 76 to be engaged and held in the recess securely by a plurality of dogs 77 fastened to the plate 76 by screws 78. The diameter of the recess 74 is selected to be larger than the diameter of the flange 73 so that the housing 51 and retained mirror can be adjusted transversely of the laser beam path 13 for alignment purposes. A pair of eccentrically mounted cams 80 are secured by bolts 85 to the plate 76 along the edge of the bottom half of the recess 74 for effecting such alignments.

Three leaf springs 79 join the mounting plate 76 to a tuning reference mounting plate 81 firmly secured to the plasma tube 12 and cooperate with tuning screws 82 to permit the separation of the plates 76 and 81 to be adjusted so that the facing angle of the retained mirror relative to the laser beam path 13 can be adjusted for alignment and tuning purposes within a limited solid angle about the laser beam path. The leaf springs 79 are spaced from one another to extend between the plates 76 and 81 at three perimeter locations. Referring to FIG. 2, the three leaf springs 79 are arranged so that straight lines drawn respectively between the two lower most leaf springs and between the two leaf springs located to the right intersect one another at a right angle. Each leaf spring 76 is formed by two leaf portions 83 and 84, one of which is fastened to plate 76 and other to plate 81 by screws 86. The leaf portions extend between the two plates 76 and 81 generally transversely with respect to the direction of movement of the tuning screws and are fastened together at their opposite ends by rivits 87 so that the leaf spring 79 is in tension between the plates.

A tuning screw 82 is located closely adjacent each leaf spring 79 to maintain the plates 76 and 81 spaced apart as they are urged toward one another by the tensioned leaf spring. Each tuning screw threadingly engages and passes through a shaft lock mechanism 88 that extends through and is secured to the mirror housing assembly mounting plate 76. The tuning screw terminates at a bearing end 89 which bears against the facing surface of the reference plate 81.

The angular position of the mirror retained in the housing assembly 51 is adjusted relative to the laser beam path 13 by advancing the tuning screws against or retracting them from the reference plate 81. Adjusting the upper right (as seen in FIG. 2) tuning screw tilts the plate 76 about the line extending between the two lower most leaf springs. Adjusting the lower left tuning screw tilts the plate 76 about the line extending between the two leaf springs located along the right edge of the plate 76. These two tuning screw adjustments provide the desired orthogonal adjustment of the mirror position relative to the laser beam path 13 whereby the angle of the face of the mirror relative to the laser beam can be adjusted within a limited solid angle about the laser beam. By adjusting the lower right tuning screw, the plane of the mirror housing assembly mounting plate 76 is adjusted relative to the reference plate 81, thereby, varying the length of the resonant cavity. After the retained mirror is placed in the desired angular position, the tuning screws can be locked in position by the shaft locks 88. A more detailed description of the tuning assembly 70 can be had by reference to my U.S. Pat. No. 3,864,029.

In the preferred embodiment of the present invention, the reference plate 81 forms an end plate of a resonator support assembly 91 that provides support for the entire laser apparatus 11. As shown in FIG. 1, the resonator support assembly 91 includes a plurality of long rods 92 firmly secured to and extending from the reference plate 81 by cooperating set screws and anaerobic adhesive (not shown in FIG. 1). Three rods are employed and they extend snugly through the reference plate to form parts of the reference plate surface facing the three tuning screws 82, the rods being in general end-to-end alignment with the three tuning screws 82 so that the screws bear against the ends of the rods. The rods are of a material having a low coefficient of thermal expansion. A metal alloy sold under the trademark "Invar" is a suitable material for fabricating the rods. An upright or support plate 93 is firmly secured to the three rods 92 at a distance from the reference plate 81 and is joined to a split yoke assembly 94 (only bottom half shown in FIG. 1) that supports the plasma tube 12 proximate the free end of the cylindrical electrode housing 17. The two halves of the split yoke assembly 94 are clamped to the housing 17 by bolt fasteners (not shown in FIG. 1) that extend through the bolt holes 96 and 97 located in the split yoke assembly on each side of the housing 17. Two blocks 98 and 99 of insulating material are fastened between the support plate 93 and the lower half of the yoke assembly 94 on each side of the plasma tube 12 by screws (not shown in FIG. 1) and serve to secure the plasma tube 12 to the support plate 93, hence, the resonator support assembly 91, while electrically isolating the resonator support assembly from the plasma tube.

By virtue of the flange 43 extending between the plasma tube 12 and the Brewster window assembly 29, the resonator support assembly 91 supports the Brewster window assembly 29 firmly at its open end 32 in a cantilevered manner. The resonator support assembly 91 also supports the mirror housing assembly 51 firmly at its flange 73 in a cantilevered manner. While the Brewster window assembly 29 and mirror housing assembly 51 are coupled together at the O-ring seal 61 close to their free ends, the cantilevered supports are arranged to bear the entire load of the Brewster window assembly and mirror housing assembly so that only minimal load is placed on the Brewster window assembly by the mirror housing assembly.

While the laser mirror mounting and protection assembly of the present invention has been described in detail in connection with a preferred embodiment arranged for use with a gas ion laser having a rod-type resonator support structure, it will be appreciated by those skilled in the art that various changes and modifications can be made in adapting the invention to such uses or other different ones. Therefore, it is intended that the scope of the invention not be limited other than by the terms of the following claims.

I claim:

1. An improved laser apparatus of the type which includes an enclosure for containing a lasable gas medium extending along a laser beam path, the enclosure including a window at one end thereof positioned to intercept said laser beam path for passage of laser radiation from said enclosure, a mirror outside said enclosure positioned to intercept said laser beam path, and a mounting structure for supporting said enclosure and said mirror, the improvement comprising a mirror housing assembly which includes a rigid tube having a generally cylindrically shape extending along said laser beam path, one end of said rigid tube including means for receiving and supporting said mirror and the opposite end of said tube extending around said one end of said enclosure having said window to provide support to said one end of said enclosure, mirror tuning means on said mounting structure for supporting said mirror housing assembly for movement to permit positioning of said mirror relative to said enclosure, said opposite end of said rigid tube including a flexible seal between the interior of said rigid tube and the exterior of said enclosure to inhibit contaminants from entering said rigid tube, said flexible seal being dimensioned to permit limited relative movement between said rigid tube of said mirror housing assembly and said enclosure to maintain a seal therebetween when said mirror is repositioned.

2. An improved laser apparatus as in claim 1 in which said flexible seal is an O-ring seal formed of sealing material positioned between the interior of said rigid tube and the exterior of said enclosure.

3. An improved laser apparatus as in claim 1 in which said mirror tuning means includes a mirror mounting plate which is adjustable in orientation with respect to said mounting structure for repositioning said mirror.

4. An improved laser apparatus as in claim 3 in which said mirror mounting plate includes an opening therethrough in which said mirror housing assembly is secured.

5. An improved laser apparatus as in claim 1 in which said mounting structure includes a plurality of rigid rods supported about said enclosure and extending in the direction of said laser beam path, together with mounting members supported by said plurality of rods and secured to said enclosure.

6. An improved laser apparatus as in claim 1 in which said flexible seal includes a first O-ring of sealing material, a rigid collar encircling said one end of said enclosure and including a first seat thereabout supporting said first O-ring, and a first seal face member encircling said one end of said enclosure and engaging said first O-ring to force said first O-ring against said first seat and against said one end of said enclosure to form said flexible seal.

7. An improved laser apparatus as in claim 6 in which said mirror housing assembly includes a first segment including said first seal face member and a second segment spaced from said first segment along and encircling the laser beam path, said second segment forming the seat for supporting the mirror, a second O-ring of sealing material for sealing said mirror to said mirror housing assembly, said second segment defining a second seat supporting said second O-ring at a location along said laser beam path on the side of said mirror away from the window, and a second seal face member engaging said second segment and said second O-ring to force said second O-ring in said second seat and against said mirror to form a seal.

8. An improved laser apparatus as in claim 1 in which said enclosure includes windows at two opposed end of said enclosure, and including two of said mirror housing assemblies and two of said mirror tuning means.

9. An improved laser apparatus of the type which includes an envelope for containing a lasable gas medium extending along a laser beam path, and a mirror outside said envelope positioned to intercept said laser beam path, the improvement comprising:
a mounting structure for supporting said envelope and said mirror, an enclosure hermetically sealed to said envelope and extending therefrom along said laser beam path, said enclosure having a window at one end to provide an exit from said envelope for laser radiation and being open into the envelope at the other end and hermetically sealed thereto such that the interiors of said envelope and said enclosure communicate, a mirror housing assembly which includes a rigid tube having a generally cylindrical shape which defines a passage extending along said laser beam path, one end of said rigid tube including means for receiving and supporting said mirror and the opposite end extending around said one end of said enclosure having said window to provide support to said one end of said enclosure, mirror tuning means on said mounting structure for supporting said mirror housing assembly for movement to permit positioning of said mirror relative to said envelope, said opposite end of said rigid tube including a flexible seal between the interior of said rigid tube and the exterior of said enclosure to inhibit contaminants from entering said rigid tube, said flexible seal being dimensioned to permit limited relative movement between said rigid tube of said mirror housing assembly and said enclosure to maintain a seal therebetween when said mirror is repositioned.

10. A laser apparatus as in claim 9 in which the hermetic seal between said envelope and said other end of said enclosure includes a flange member joined to said enclosure proximate said other end for supporting said tubular member from the envelope in a cantilevered manner.

11. A laser apparatus as in claim 10 in which said enclosure is an elongated tubular member which includes a metal segment along a length thereof at said other end and a glass segment along a length thereof at said one end having said window, said flange member being metal and having a central portion that encircles and is welded to said metal segment of said tubular member to form a hermetic seal about said tubular member, and said flange member extending outwardly from said central portion to a peripheral portion for joining by welding to said envelope, said flexible seal including a first O-ring of sealing material, a rigid collar encircling said elongated tubular member and defining a first seat thereabout supporting said first O-ring, and a first seal face member encircling said elongated tubular member and engaging said first O-ring to force said first O-ring against said first seat and against said glass segment of said tubular member to form said flexible seal.

12. A laser apparatus as in claim 11 in which said mirror housing assembly includes a first segment incorporating said first seal face member and a second segment spaced from said first segment along and encircling the laser beam path, said second segment forming the seat for supporting the mirror, including a second O-ring of sealing material for sealing said mirror to said mirror housing assembly, said second segment defining a second seat supporting said second O-ring at a location along said laser beam axis on the side of said mirror away from said window, and a second seal face member engaging said second segment and said second O-ring to force said second O-ring in said second seat and against said mirror to form a seal.

13. A laser apparatus as in claim 10 in which said rigid tube of said mirror housing assembly has an externally threaded tubular segment at said opposite end thereof proximate said window, said externally threaded tubular segment terminating at a tapered surface facing toward the surrounded enclosure to form a seal face, said flexible seal including a rigid collar surrounding said externally threaded tubular segment in threaded engagement therewith and defining an O-ring seat facing said externally threaded tubular segment, and a first O-ring of sealing material sandwiched between said O-ring seat and said seal face formed by said externally threaded tubular segment to be forced against said envelope to form a sealed joint, said rigid tube having a counter bore entering therein at said one end thereof, a first length of said counter bore extending from said one end at a first diameter and the remaining length of counter bore at a second diameter smaller than said first diameter and including internal threads, said counter bore terminating at a shoulder to form a seat supporting the mirror, said mirror extending from said shoulder into said remaining length of said counter bore, and a second seal between the mirror and said rigid tube including an externally threaded member in threaded engagement with said threaded segment of said counter bore at said second diameter, said externally threaded member having a tapered surface facing toward said mirror and the counter bore wall, and a second O-ring of sealing material sandwiched between said tapered surface of said externally threaded member and said mirror to be forced against said counter bore wall to form said second seal.

14. A laser apparatus as in claim 9 in which the mounting structure includes a plurality of rigid rods supported about the envelope of said laser apparatus and extending in the direction of the laser beam path, and a plurality of rigid mounting members supported by said plurality of rods.

15. A laser apparatus as in claim 14 in which said mirror tuning means includes a first mounting member fastened to said plurality of rods, and a mirror mounting plate spaced from and joined to said first mounting member by means for setting and adjusting the planar orientation of said mirror mounting plate relative to said first mounting member, said mirror housing assembly being secured to said mirror mounting plate.

16. A laser apparatus as in claim 15 in which said mirror housing assembly includes an externally extending flange proximate said one end where said mirror is located, and said mirror mounting plate includes a co-operating recess for receiving said flange together with means for securing said mirror housing assembly to said mirror mounting plate.

* * * * *